N. H. SUREN.
ELECTROMAGNET.
APPLICATION FILED JULY 22, 1910.
1,029,150.
Patented June 11, 1912.
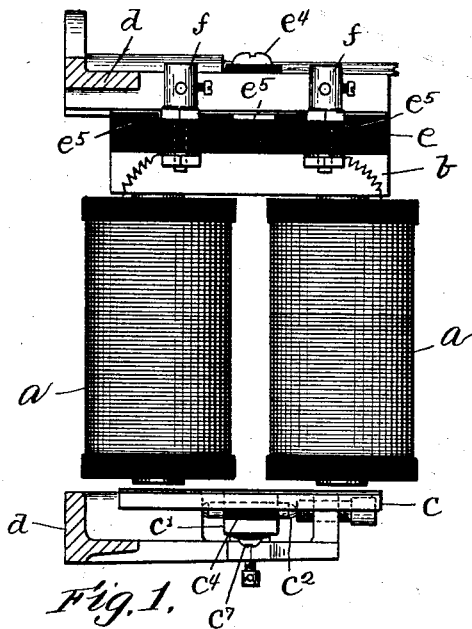
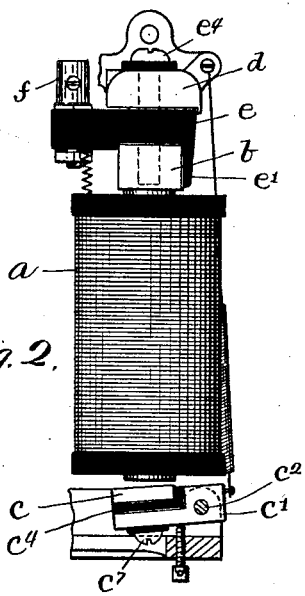
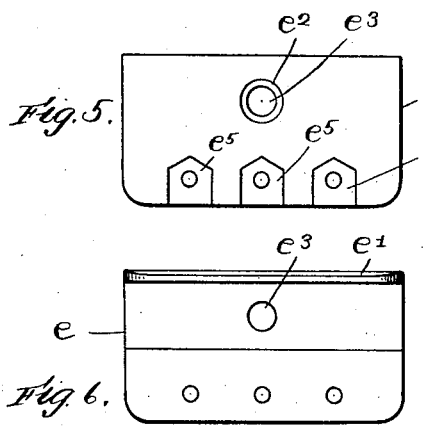
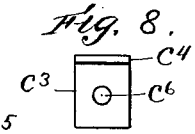
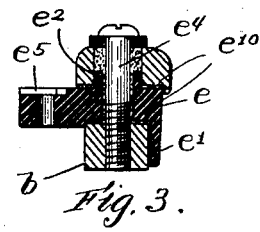
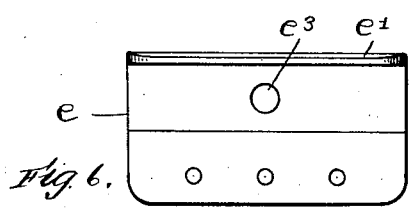
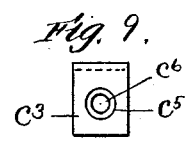
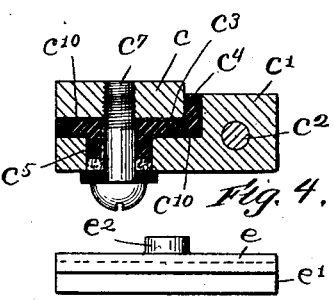
Witnesses:
H. B. Davis.
H. A. Best.
Inventor:
Nathan H. Suren
by Noyes & Harriman
Attys.
COLUMBIA PLANOGRAPH CO., WASHINGTON, D. C.

UNITED STATES PATENT OFFICE.

NATHAN H. SUREN, OF NEEDHAM, MASSACHUSETTS, ASSIGNOR TO THE GAMEWELL FIRE-ALARM TELEGRAPH COMPANY, OF NEW YORK, N. Y., A CORPORATION OF NEW YORK.

ELECTROMAGNET.

1,029,150.  Specification of Letters Patent.  Patented June 11, 1912.

Application filed July 22, 1910. Serial No. 573,292.

*To all whom it may concern:*

Be it known that I, NATHAN H. SUREN, of Needham, county of Norfolk, State of Massachusetts, have invented an Improvement in Electromagnets, of which the following is a specification.

This invention relates to electro-magnets, and has for its object to provide non-inflammable, non-carbonizable means having high insulating properties, arranged between the magnet-spools and the supporting-frame therefor, such means being preferably constructed to support binding-posts to which the magnet-wires and circuit-wires are attached; and also to provide similar means between the armature and the armature-carrying-plate, whereby in case an electric current of high potential passes through the magnet and the coils thereof are burned, an arc will not be formed with the supporting-frame or adjacent parts, with the consequent liability of destruction of the same, and the apparatus which is located adjacent thereto or beyond it.

Among the many uses to which an electromagnet is put is in a fire-alarm telegraph box, and, in such instance, the magnet-coils act as choke-coils to the passage of a high potential alternating current, and in case they are burned, a substance is produced composed essentially of carbon, which is a high electric conductor, and a path is established by which the current is free to pass to the ground. The destruction of the apparatus contained in the box and the instruments connected with the circuit are the usual results attending the passage of a high potential current, but, by the employment of my invention, such results are obviated, and the liability of persons being injured by electrical connection being established between the electrical and mechanical parts of the box is overcome.

As a material well suited for the purposes of my invention I may employ porcelain, yet other ceramic material or vitreous material, as glass, having high insulating properties and which is non-carbonizable may be employed.

Figure 1 is a front elevation of an electromagnet embodying this invention. Fig. 2 is a side view of the same. Figs. 3 and 4 are enlarged sectional details to be referred to. Figs. 5, 6 and 7 are views of the means embodying my invention which is interposed between the supporting-frame and the magnet-spools. Figs. 8, 9 and 10 are details of the means embodying my invention, which is interposed between the armature and supporting-plate therefor. Figs. 11 and 12 are views of a modified form of means interposed between the supporting-frame and magnet-spools.

$a$, $a$, represent the magnet-spools, $b$, the heel-piece, and $c$ the armature of an electromagnet, which may be all of any usual or suitable construction.

$d$ represents a portion of any usual or suitable supporting-frame for the magnet. As here shown, it is made as a casting.

$e$ represents an insulating-plate, embodying one of the features of this invention, which is interposed between the magnet-spools and supporting-frame therefor. As here shown said plate is designed to engage the heel-piece $b$ of the magnet, and is formed with a longitudinal recess for said heel-piece, and has a lip $e'$ which extends down along one side of the heel-piece, see Figs. 3 and 7, which terminates at or near the lower edge of said heel-piece, and thereby incloses and protects said heel-piece. Said plate also has, at a point intermediate its length, a hole $e^3$ for the attaching-screw $e^4$, and on its upper side, surrounding said hole, it has a flange $e^2$, which is designed to extend up into a hole in the supporting-frame. The attaching-screw $e^4$ extends down through said hole in the supporting-frame and through the hole $e^3$ in the plate and is screwed into the heel-piece, thereby connecting the magnet with the supporting-frame and holding the insulating-plate in fixed position therebetween, but said screw is well insulated from the supporting-frame. The plate $e$ is extended forward to provide supports for one or more binding-posts $f$, and, as here shown, provision is made for three binding-posts, and the top of the plate is recessed as at $e^5$, see Figs. 3, 5 and 7, to receive the bases of the binding-posts, and is perforated to provide for the passage therethrough of the usual attaching-screws by which the binding-posts are secured to the plate. Said recesses $e^5$ are preferably made of a shape to correspond with the hexagonal bottoms of the binding-posts to receive them and thereby hold the posts from turning. Said plate $e$, formed in this manner or in any other suitable manner, is preferably composed of porcelain or other non-carbonizable material having high insulating properties. When composed of such material, which is somewhat brittle, it is desirable to support the insulating-plate in a yielding manner, and, as here shown, material such as putty may be placed beneath the plate and also above it, so that layers of putty $e^{10}$ are provided between the plate and the adjacent parts.

Referring to Figs. 11 and 12, wherein a modified form of insulating-plate $e$ is shown, the supporting portion for the binding-posts is omitted, the plate being merely recessed longitudinally to receive the heel-piece and having a hole for the attaching-screw and flange surrounding said hole, one side wall of the recess being extended down to the lower edge of the heel-piece. The armature $c$ is supported by a plate $c'$, pivoted at $c^2$, but herein said armature is insulated from its supporting-plate by a plate composed of non-carbonizable material having high insulating properties, such as porcelain, said insulating-plate being represented at $c^3$, see Figs. 4, 8 and 9. Said insulating-plate $c^3$ is recessed to receive the armature $c$, or, as here shown, is formed with a lip $c^4$ along one edge, which extends upwardly, to thereby provide insulating material between the inner edge of the armature and its supporting-plate. Said insulating-plate $c^3$ has on its under side an annular flange $c^5$ surrounding a hole $c^6$, and the attaching-screw $c^7$ extends through a hole in the supporting-plate and through said hole $c^6$ and into the armature $c$, thereby connecting the armature with its supporting-plate and also holding the insulating-plate in fixed position therebetween. Said attaching-screw is well insulated from the supporting-plate $c'$. In lieu of forming the insulating-plate $c^3$ in this manner, it may be otherwise constructed, and still occupy a position between the armature and its supporting-plate and come within the spirit and scope of my invention. Said insulating-plate, like the insulating-plate heretofore described, is supported in a yielding manner, as by layers of putty $e^{10}$ arranged above and below it.

Having thus described my invention, what I claim as new and desire to secure by Letters Patent is:—

1. In an electro-magnet, the combination with the magnet-coils and heel-piece connected thereto, of a supporting-frame, a plate composed of noncarbonizable material having high insulating properties interposed between the heel-piece and supporting-frame which extends from end to end of the heel-piece and is extended forward to provide a support for a plurality of binding-posts, binding-posts arranged thereon, and means to hold said plate in fixed position, substantially as described.

2. In an electro-magnet, the combination with the magnet-coils and heel-piece connected thereto, of a supporting-frame, an insulating plate interposed between said frame and heel-piece which is angularly formed and extends entirely over the top and one side of the heel-piece, and means to connect said heel-piece with the frame and to hold the insulating-plate in fixed position therebetween, substantially as described.

3. In an electro-magnet, the combination with the magnet-coils and heel-piece connected thereto, of a supporting-frame and an insulating-plate interposed between said frame and heel-piece which extends from end to end of the heel-piece, and has a recess throughout its length to receive said heel-piece, one side wall of said recess extending downwardly to the lower edge of the heel-piece, substantially as described.

4. In an electro-magnet, the combination of the magnet-coils and heel-piece, of a supporting-frame and an angularly formed insulating-plate arranged between said heel-piece and frame which extends over the top and one side of the heel-piece from end to end thereof and which extends forward at the opposite side of the heel-piece to provide a bearing portion for binding-posts, binding-posts arranged on said forwardly extended portion, and means to connect said heel-piece with said frame and to hold the insulating-plate in fixed position therebetween, substantially as described.

5. In an electro-magnet, the combination with the magnet-coils and armature, of a supporting-plate for the armature, and a plate interposed between the armature and its supporting-plate composed of non-carbonizable material having high insulating properties, and means for holding it in fixed position therebetween, substantially as described.

6. In an electro-magnet, the combination with the magnet-coils and armature, of a supporting-plate for the armature, and an insulating-plate arranged between the armature and its supporting-plate having a lip along one side of the armature, and means for holding said insulating-plate in fixed position, substantially as described.

7. In an electro-magnet, the combination with the magnet-coils and armature, of a supporting-plate for the armature, and an insulating-plate yieldingly supported between said armature and its supporting-plate, substantially as described.

In testimony whereof, I have signed my name to this specification, in the presence of two subscribing witnesses.

NATHAN H. SUREN.

Witnesses:
H. B. DAVIS,
B. J. NOYES.

Copies of this patent may be obtained for five cents each, by addressing the "Commissioner of Patents, Washington, D. C."